(12) United States Patent
Lee et al.

(10) Patent No.: US 11,870,518 B2
(45) Date of Patent: Jan. 9, 2024

(54) METHOD AND APPARATUS FOR TRANSMISSION AND RECEPTION BASED ON LINE PANEL CODEBOOK IN WIRELESS COMMUNICATION SYSTEM

(71) Applicant: Korea University Research and Business Foundation, Seoul (KR)

(72) Inventors: In Kyu Lee, Seoul (KR); Zhilin Fu, Seoul (KR); Ji Hwan Moon, Seoul (KR); Sang Won Hwang, Busan (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/752,095

(22) Filed: May 24, 2022

(65) Prior Publication Data
US 2023/0216554 A1 Jul. 6, 2023

(30) Foreign Application Priority Data
Jan. 3, 2022 (KR) .................. 10-2022-0000250

(51) Int. Cl.
*H04B 7/02* (2018.01)
*H04B 7/0456* (2017.01)
*H04B 7/06* (2006.01)

(52) U.S. Cl.
CPC ......... *H04B 7/0456* (2013.01); *H04B 7/0639* (2013.01); *H04B 7/0626* (2013.01)

(58) Field of Classification Search
CPC ... H04B 7/0456; H04B 7/0639; H04B 7/0626
USPC .......................................................... 375/267
See application file for complete search history.

(56) References Cited

U.S. PATENT DOCUMENTS

| | | | |
|---|---|---|---|
| 8,891,652 B2 | 11/2014 | Gaal et al. | |
| 9,225,478 B2 * | 12/2015 | Chen ..................... | H04L 5/0073 |
| 9,252,852 B2 | 2/2016 | Kim et al. | |
| 10,469,146 B1 * | 11/2019 | Ekbatani .............. | H04B 7/0632 |

FOREIGN PATENT DOCUMENTS

| | | | |
|---|---|---|---|
| CN | 105103466 A | | 11/2015 |
| CN | 109391305 A | * | 2/2019 |
| CN | 109980362 A | | 7/2019 |
| SE | WO 2018127426 | * | 7/2018 |

* cited by examiner

*Primary Examiner* — Helene E Tayong
(74) *Attorney, Agent, or Firm* — NSIP Law (57) ABSTRACT

The present disclosure relates to design of a line panel codebook and a method and an apparatus for transmission and reception based on it in a wireless communication system. A method in which a transmitter transmits a precoded signal to a receiver in a wireless communication system according to an embodiment of the present disclosure may include determining one or more codewords and a panel phase factor for each of a plurality of line panels equipped with the transmitter; precoding data which will be transmitted to the receiver based on the determined one or more codewords and a panel phase factor; and transmitting the precoded signal to the receiver.

14 Claims, 5 Drawing Sheets

METHOD AND APPARATUS FOR TRANSMISSION AND RECEPTION BASED ON LINE PANEL CODEBOOK IN WIRELESS COMMUNICATION SYSTEM

CROSS-REFERENCE TO RELATED APPLICATIONS

This application claims the benefit of earlier filing date and right of priority to Korean Application No. 10-2022-0000250, filed on Jan. 3, 2022, the contents of which are all hereby incorporated by reference herein in their entirety.

TECHNICAL FIELD

The present disclosure relates to transmission and reception based on a codebook in a wireless communication system and specifically, relates to design of a line panel codebook and a method and an apparatus for transmission and reception based on it in a wireless communication system.

BACKGROUND ART

A multiple antenna or MIMO (Multiple Input Multiple Output) communication system may be divided into an open loop system or a closed loop system according to whether feedback is performed from a receiver to a transmitter. An open loop system includes a transmitter operating without channel status information (CSI) or information on a channel from a transmitter to a receiver and a closed loop system includes a transmitter operating by considering CSI obtained from a receiver.

Precoding-related information (e.g., Precoding Matrix Index, PMI) may be included in CSI fed back by a receiver in a closed loop system. Precoding (or beamforming) means that a transmitter maps a transmission stream/layer to multiple antennas (or antenna ports) and that mapping relation may be expressed by a precoding matrix (or vector). A transmitter may perform precoding by referring to precoding information fed back from a receiver.

Precoding information which is fed back may be limited to a scope of a set of precoding matrix(es) shared in a transmitter and a receiver. A predefined set including precoding matrix(es) as an element may be referred to as a codebook, one codebook may include one or more codewords and each codeword may correspond to one precoding matrix.

A FD-MIMO system is a system that antennas are arranged in a transmitter (e.g., a base station) in a two-dimensional flat way. A multi-panel-based FD-MIMO system was proposed that an antenna of multiple panels is applied to solve a difficulty such as installation when the number of antennas increases and so on. It is referred to as a MPA system and has an advantage of reducing costs and electricity. But, in a MPA system, there is a problem of having a different phase offset between panels or phase uncertainty and a problem that it is difficult to design a codebook which is suitable for multiple panels and reduces a feedback overhead.

DISCLOSURE

Technical Problem

A technical object of the present disclosure is to provide a codebook design and a corresponding codebook-based transmission and reception method and device which improve accuracy of feedback information in a multi-panel array system.

An additional technical object of the present disclosure is to provide a codebook design and a corresponding codebook-based transmission and reception method and device which reduce computational complexity and a feedback overhead in a multi-panel array system.

The technical objects to be achieved by the present disclosure are not limited to the above-described technical objects, and other technical objects which are not described herein will be clearly understood by those skilled in the pertinent art from the following description.

Technical Solution

A method in which a transmitter transmits a precoded signal to a receiver in a wireless communication system according to an aspect of the present disclosure may include determining one or more codewords and a panel phase factor for each of a plurality of line panels equipped with the transmitter; precoding data which will be transmitted to the receiver based on the determined one or more codewords and the panel phase factor; and transmitting the precoded signal to the receiver.

A device which transmits a precoded signal in a wireless communication system according to an additional aspect of the present disclosure includes a multi-antenna array equipped with a plurality of line panels; a transceiver; a memory; and a processor and the processor may be configured to determine one or more codewords and a panel phase factor for each of the plurality of line panels; precode data which will be transmitted to a receiver based on the determined one or more codewords and the panel phase factor; and transmit the precoded signal to the receiver through the transceiver.

The characteristics which are simply summarized above for the present disclosure are just an illustrative aspect of a detailed description of the after-described present disclosure and do not limit a scope of the present disclosure.

Technical Effects

According to the present disclosure, a codebook design and a corresponding codebook-based transmission and reception method and device which reduce computational complexity and a feedback overhead while improving accuracy of feedback information in a multi-panel array system may be provided.

Effects achievable by the present disclosure are not limited to the above-described effects, and other effects which are not described herein may be clearly understood by those skilled in the pertinent art from the following description.

DESCRIPTION OF DIAGRAMS

DETAILS

Hereinafter, an embodiment of the present disclosure will be described in detail so that those skilled in the pertinent art from the following description can easily carry it out by referring to an attached diagram. However, the present disclosure may be implemented in a variety of different forms and is not limited to an embodiment which is described herein.

In describing an embodiment of the present disclosure, when it is determined that a detailed description on a disclosure configuration or function could cloud a gist of the present disclosure, a detailed description thereon is omitted. In addition, a part irrelevant to a description on the present disclosure in a diagram is omitted and a similar diagram code is attached to a similar part.

In the present disclosure, when an element is referred to as being "connected", "combined" or "linked" to another element, it may include an indirect connection relation that yet another element presents therebetween as well as a direct connection relation. In addition, when an element is referred to as "including" or "having" another element, it means that another element may be additionally included without excluding another element unless otherwise specified.

In the present disclosure, a term such as first, second, etc. is used only to distinguish one element from other element and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

In the present disclosure, elements which are distinguished each other are to clearly describe each characteristic and do not mean that elements must be separated. In other words, a plurality of elements may be combined and configured in a unit of one hardware or software and one element may be distributed and configured in a unit of a plurality of hardware or software. Accordingly, even if separately mentioned, such a combined or distributed embodiment is also included in a scope of the present disclosure.

In the present disclosure, elements described in a variety of embodiments do not necessarily mean essential elements and some may be a selective element. Accordingly, an embodiment configured with a subset of elements described in an embodiment is also included in a scope of the present disclosure. In addition, an embodiment which additionally includes other element in elements described in a variety of embodiments is also included in a scope of the present disclosure.

The present disclosure is about a communication between network nodes in a wireless communication system. A network node may include at least one of a base station, a terminal or a relay. A term of a base station (BS) may be substituted with a term such as a fixed station, a Node B, an eNodeB (eNB), a ng-eNB, a gNodeB (gNB), an Access Point (AP), etc. A terminal may be substituted with a term such as UE(User Equipment), a MS (Mobile Station), a MSS (Mobile Subscriber Station), a SS (Subscriber Station), a non-AP station (non-AP STA), etc.

A wireless communication system may support a communication between a base station and a terminal and may support a communication between terminals. In a communication between a base station and a terminal, a downlink (DL) means a communication from a base station to a terminal. An uplink (UL) means a communication from a terminal to a base station. A communication between terminals may include a variety of communication methods or services such as D2D (Device-to-Device), V2X (Vehicle-to-everything), ProSe (Proximity Service), a sidelink communication, etc. In a communication between terminals, a terminal may be implemented in a form of a sensor node, a vehicle, a disaster alarm, etc.

In addition, the wireless communication system may include a relay or a relay node (RN). When a relay is applied to a communication between a base station and a terminal, a relay may function as a base station for a terminal and a relay may function as a terminal for a base station. Meanwhile, when a relay is applied to a communication between terminals, a relay may function as a base station for each terminal.

The present disclosure may be applied to a variety of multi access methods of a wireless communication system. For example, a multi access method may include CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, NOMA (Non-Orthogonal Multiple Access), etc. In addition, a wireless communication system to which the present disclosure may be applied may support a TDD (Time Division Duplex) method which uses a time resource that uplink and downlink communications are distinguished each other or may support a FDD (Frequency Division Duplex) method which uses frequency resources which are distinguished each other.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a codebook design which may be applied to a MPA system and examples of the present disclosure related to transmission and reception based on a corresponding codebook are described.

A FD-MIMO system is a system that antennas are arranged in a transmitter (e.g., a base station) in a two-dimensional flat way. A FD-MIMO system has an advantage that it has a higher degree of freedom of a beam direction and processes information faster than a general multi-antenna system and it can save an arrangement space. Meanwhile, a device gets larger and a wide installation place is required to place a large number of antennas. To get over such a difficulty, a multi-panel-based FD-MIMO which reduces costs and electricity by assembling a plurality of panel antennas was proposed.

It is needed to precisely figure out or share channel information or a communication environment between a transmitter and a receiver to improve performance of a multi-antenna system. For example, codebook-based channel status information (CSI) feedback may be used. For example, a base station and a terminal (or a user) may share the same codebook information in advance and a terminal may estimate channel information by using a signal received from a base station (e.g., a reference signal (RS) or a pilot signal, etc.), determines a codeword which is most similar or closest to actual channel information in a codebook (e.g., a precoding matrix) and perform feedback for an index of a determined codeword (e.g., a precoding matrix index (PMI)) to a base station. Accordingly, a base station may check a codeword indicated by a received codeword index in a codebook and determine channel information estimated by a terminal.

A RF (Radio Frequency) circuit is installed not to be overlapped for each panel in a MPA system. In other words, because each panel is physically separated in a MPA system, a distance between antenna elements may not be uniform. In addition, RF chains of a different panel may not be perfectly calibrated in terms of sampling clock timing or a carrier frequency, so a problem of phase ambiguity (PA) having a different phase offset in each panel may occur. Due to this PA problem, a method in which a codebook is designed by considering the entire panel array as a single panel may not be applied and a method in which a codebook is designed per each panel may be considered.

In a 3GPP communication standard, two types, i.e., Type-I and Type-II, of a codebook design method were proposed. While a Type-I codebook supports selecting one or all beams among a plurality of beam (or precoding matrix) groups, a Type-II codebook may select a plurality of beams (or beam groups) and support a beam direction corresponding to a linear combination of any number of beams among them. Specifically, while a Type-I codebook may select (or perform oversampling for) 1 or 4 beams among a beam group including 4 beams, but has a lower degree of freedom compared with a Type-II codebook, a Type-II codebook may select (or perform oversampling for) 1, 2, 3 or 4 beams among a beam group including 4 beams more freely than a Type-I codebook. While a Type-I codebook is mainly optimized for single user (SU)-MIMO transmission and has a relatively small feedback overhead, a Type-II codebook is mainly optimized for multi-user (MU)-MIMO transmission and has a relatively large feedback overhead because it has more sophisticated channel information. In other words, a Type-I codebook-based transmission and reception operation has a lower computational complexity than a Type-II codebook-based transmission and reception operation, but may have relatively low accuracy of channel information.

A codebook which may be applied to a MPA system is a Type-I MP (multi-panel) codebook, but it has a problem that accuracy of channel information is low as described before. Meanwhile, when a Type-II SP (single panel) codebook is directly applied to a MPA system, computational complexity may get higher and performance degradation caused by a PA problem between panels may occur and a large number of antenna elements may increase a codebook size, which may greatly increase a feedback overhead.

Accordingly, examples of the present disclosure on a new method of improving accuracy of feedback information (e.g., CSI) and reducing computational complexity and a feedback overhead for a MPA system by breaking away from the existing codebook design method are described as follows.

Figure 1:
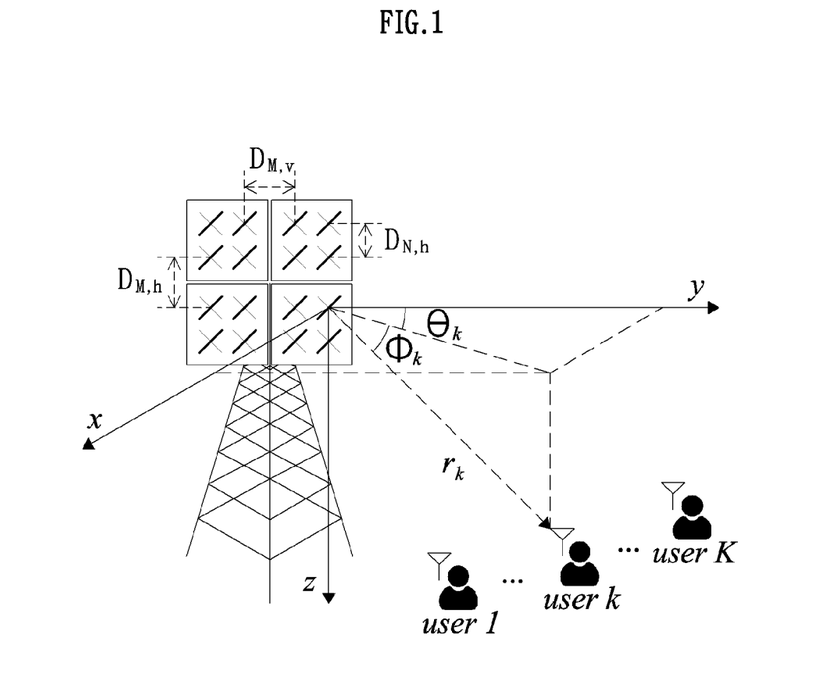
FIG. 1 is a diagram which represents an example of a MPA system to which the present disclosure may be applied.

FIG. 1 is a diagram which represents an example of a MPA system to which the present disclosure may be applied.

To clearly describe a principle of a codebook design, the present disclosure assumes a wireless communication system that one base station equipped with a MPA and K terminals (or users) equipped with a single antenna exist. In addition, a base station and terminal(s) are assumed to perform transmission and reception by a FDD method.

In addition, a MPA system assumes that a base station is equipped with $M_v$ panels in a vertical direction and $M_h$ panels in a horizontal direction. It is assumed that each panel has a uniformly-spaced rectangular antenna array (URA) and is equipped with $N_v$ antennas in a vertical direction and $N_h$ antennas in a horizontal direction. It is assumed that K terminals are served on the same time/frequency resource.

Based on a physical characteristic of such a MPA system, a spatial channel model (SCM) that a channel model represents a three-dimensional correlation between multiple antennas is assumed.

In this case, $H_k$, an aggregated channel matrix between a base station and a k-th terminal, may be indicated as $H_k^p \in \mathbb{C}^{M_v N_v \times M_h N_h}$ and may be defined as follows.

$$H_k = \frac{1}{\sqrt{P}} \sum_{p=1}^{P} H_k^p \quad \text{[Equation 1]}$$

In Equation 1, P corresponds to the number of paths and $H_k^P$ represents a channel matrix in a p-th path.

In this case, a $(n_v, n_h)$-th element of a channel matrix in a p-th path may be represented as follows. Here, $n_v$ is 1,2, . . . , $M_v N_v$ and $n_h$ is 1, 2, . . . , $M_h N_h$.

$$[H_k^p]_{n_v,n_h} = \rho_k^p \exp\left(-j\frac{2\pi}{\lambda}\left(\Delta_{v,n_v}\sin\phi_k^p + \Delta_{h,n_h}\cos\theta_k^p\cos\phi_k^p\right)\right) \quad \text{[Equation 2]}$$

In Equation 2, $\rho_k^P$ is a large-scale fading coefficient and $\lambda$ is a wavelength. In addition, in reference to FIG. 1, in Equation 2, $\theta_k$ and $\varphi_k$ correspond to an azimuth angle of departure (AOD) and a zenith angle of departure (ZOD) until a k-th terminal from a base station.

In Equation 2, $\Delta_{v,n_v}$ and $\Delta_{h,n_h}$ specify spacing between antenna elements in a vertical direction and in a horizontal direction, respectively. In other words, $\Delta_{v,n_v}$ and $\Delta_{h,n_h}$ represents a spatial factor in a vertical and horizontal domain representing a spatial characteristic of a two-dimensional antenna arrangement. $\Delta_{v,n_v}$ and $\Delta_{h,n_h}$ are defined as follows.

$$\Delta_{v,n_v} = D_{M,v}\left(\left\lceil\frac{n_v}{N_v}\right\rceil - 1\right) + D_{N,v}\left(n_v - \left\lceil\frac{n_v}{N_v}\right\rceil\right) \quad \text{[Equation 3]}$$

$$\Delta_{h,n_h} = D_{M,h}\left(\left\lceil\frac{n_h}{N_h}\right\rceil - 1\right) + D_{N,h}\left(n_h - \left\lceil\frac{n_h}{N_h}\right\rceil\right)$$

In reference to FIG. 1, in Equation 3, $D_{M,v}$ and $D_{M,h}$ correspond to a distance between antenna panels in a vertical and horizontal direction, respectively. $D_{N,v}$ and $D_{N,h}$ correspond to a distance between antenna elements in a vertical and horizontal direction, respectively.

In the following description, $H_k$, a channel matrix for a k-th terminal in a MPA system as in the above-describe assumption, may be expressed as $h_k$, a vector form, to calculate CSI.

Figure 2:
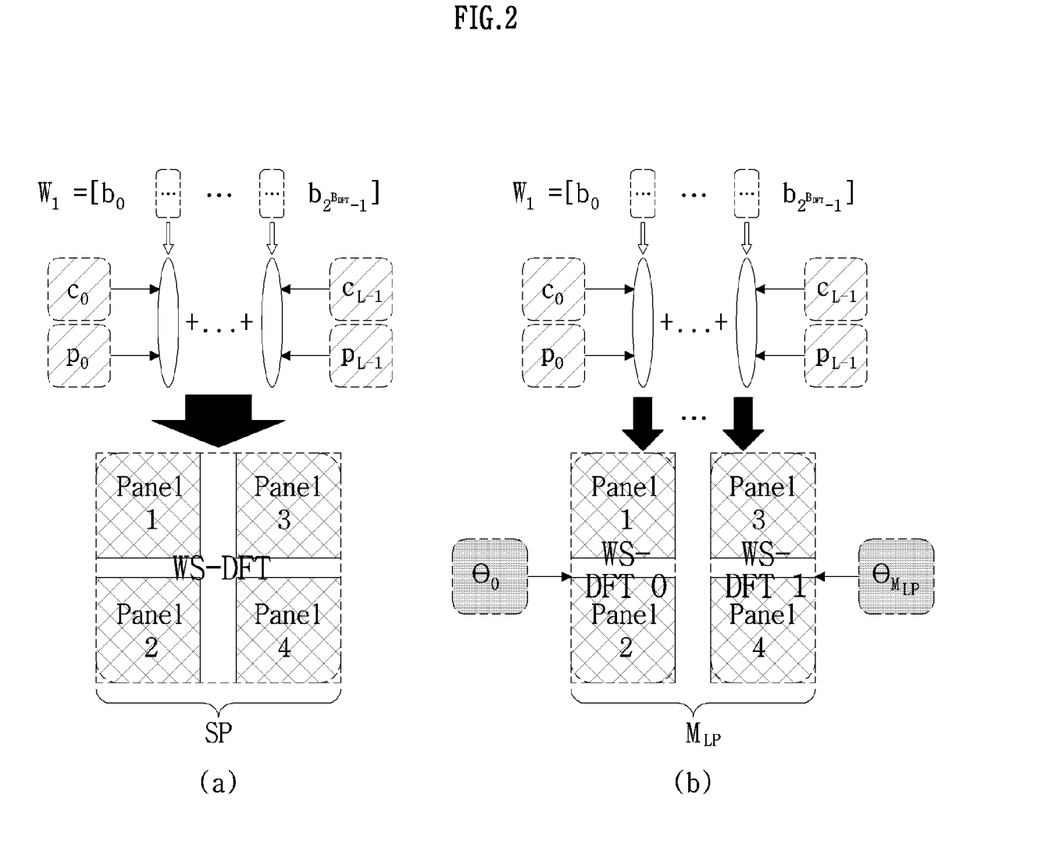
FIG. 2 is a diagram for describing a line panel codebook design according to the present disclosure.

FIG. 2 is a diagram for describing a line panel codebook design according to the present disclosure.

First, a Type-II single panel (SP) codebook design is described by referring to FIG. 2(a). The existing Type-II SP codebook design may have high resolution of CSI feedback, define multiple oversampled DFT (discrete Fourier transform) beams and support a precise beam direction by a linear combination of a plurality of (e.g., 2, 3 or 4) DFT beams (e.g., a WS (weighted sum)-DFT method).

For example, the existing Type-II SP codebook design may quantify CSI and adjust power and a phase of multiple oversampled DFT beams when generating a DFT codebook. The entire CSI feedback framework is configured with wide-band (WB) information and sub-band (SB) information. First, L oversampled two-dimensional DFT beams may be fed back by WB information and it may be associated with power (or amplitude). In addition, correlation power and co-phasing adjustment information combining L beams may be fed back through SB information. A combined beam may be expressed as follows.

$$\omega_{r,l} = \sum_{i=0}^{L-1} b_{n_v^{(i)} n_h^{(i)}}(i) p_{r,l,i}^{(WB)} p_{r,l,i}^{(SB)} c_{r,l,i}$$ [Equation 4]

In Equation 4, $b_{n_v(i)n_h}(i)$ corresponds to a i-th oversampled two-dimensional DFT beam and $n_v^{(i)}$ and $n_h^{(i)}$ correspond to a beam index of a vertical and horizontal domain, respectively. In addition, r corresponds to polarization and may have a value of 0 or 1. And, l corresponds to a layer and may have a value of 0 or 1. Next, $p_{r,l,i}^{(WB)}$ and $p_{r,l,i}^{(SB)}$ correspond to a beam amplitude scaling coefficient for a WB and a SB, respectively. And, $c_{r,l,i}$ corresponds to a beam phase. To achieve a low CSI feedback overhead, a Type-II WB-dedicated model which receives feedback for WB information alone and uses it is widely used by defining $p_{r,l,i}^{(SB)}$ as 0 bit.

A Type-II WB-dedicated model-based line panel (LP) codebook design is described by referring to FIG. 2(b).

A line panel (LP) corresponds to a set of antenna panels in a vertical direction among two-dimensional antenna panels. In FIG. 2(b), panel 1 and 2 may correspond to LP 1 and panel 3 and 4 may correspond to LP 2. For example, it may be assumed that an antenna array includes $M_{LP}$ LPs and each LP has Np antenna ports.

A LP-based codebook design uses a characteristic that in a Type-II WB dedicated model, multiple antenna panels arranged in a vertical direction (i.e., one line panel) may form a thinner beam in a vertical direction and a wider beam in a horizontal direction. In other words, as more antennas are overlapped in a vertical direction, a beam concentrated on a wanted specific vertical direction may be formed, a coverage region may get wider and a gain in a horizontal direction may increase.

In addition, a LP-based codebook design may compensate a PA problem in CSI calculation with the existing Type-II codebook through a panel co-phasing coefficient by combining some panels. A panel co-phasing coefficient may correspond to a factor which equalizes sampling time to solve a PA problem caused by a difference of sampling time or an oscillator per panel. A panel co-phasing coefficient may be applied per panel, but in the present disclosure, it is assumed to be applied per line panel. In other words, it is assumed that a phase difference or a sampling time difference between a plurality of panels belonging to one line panel may be disregarded.

In supporting precise beamforming by a linear combination of one or more DFT beams by a WS-DFT method, when a line panel is configured by grouping panels in a vertical direction, it has an advantageous effect in terms of a beam form compared with grouping panels in a horizontal direction. In addition, grouping antenna elements corresponds to grouping in one antenna RF chain, so a PA problem does not occur although multiple RF chains exist in the same one panel, but when a different RF chain exists per antenna panel, it is required to solve a PA problem which occurs when different RF chains are grouped. Accordingly, the present disclosure proposes a method that precision of a beam direction may be improved and a PA problem between panels may be resolved by applying a new method called a line panel which groups antenna panels in a vertical direction.

First, a codebook candidate matrix $C_{SLP}=\{C_{SLP}^{(1)}, C_{SLP}^{(2)}, \ldots, C_{SLP}^{(S)}\}$ is generated through a Type-II WB dedicated model for a single line panel (SLP).

In addition, a channel vector corresponding to a $m_{LP}$-th line panel for a k-th terminal may be represented as $h_{m_{LP},k}$ and $\bar{h}_{m_{LP},k}$, an individual channel vector calculated by a base station, may be defined as follows.

$$\bar{h}_{m_{LP},k} = c_{SLP}^{(i^*_{m_{LP},k})}$$ [Equation 5]

$$i^*_{m_{LP},k} = \underset{1 \leq i \leq S}{\operatorname{argmax}} |h_{m_{LP},k}^H c_{SLP}^{(i)}|$$

In Equation 5, $$\underset{1 \leq i \leq S}{\operatorname{argmax}} |ax^{(i)}|$$

corresponds to an operation of obtaining $x^{(i)}$, a vector whose absolute value is maximized by being multiplied by a vector a among X, a matrix including S vectors.

When a codeword of each single line panel codebook is determined, a panel co-phasing coefficient representing a channel characteristic may be applied per line panel. Among CSI feedback bits, the number of bits for a coefficient compensating a phase per line panel is assumed as $B_{LP}$ bits. In this case, $S_{PA}$ codewords are included in a panel phase calibration codebook $\Theta_{PA}$ and $S_{PA}=2^{B_{LP}(M_{LP}-1)}$. In addition, $S_{PA}$ codewords may be defined in a form of $$[e^{j\theta_1}, \ldots, e^{j\theta_{m_{LP}}}, \ldots, e^{j\theta_{M_{LP}}}]^T.$$

Here, a phase factor may be defined as $$\theta_{m_{LP}} \in \left\{0, \frac{2\pi}{2^{B_{LP}}}, \ldots, \frac{2\pi(2^{B_{LP}}-1)}{2^{B_{LP}}}\right\}.$$

A final line panel codebook $C_{LP}=\{c_{LP}^{(1)}, c_{LP}^{(2)}, \ldots, c_{LP}^{(S_{PA})}\}$ may be determined based on the above-described single line panel codebook ($C_{SLP}$) and panel phase calibration codebook ($\Theta_{PA}$) (e.g., by finding an inner product of $C_{SLP}$ and $\Theta_{PA}$). A specific candidate codeword may be represented as follows.

$$c_{LP}^{(i)} = [e^{j\theta_1} h_{1,k}, \ldots, e^{j\theta_{m_{LP}}} h_{m_{LP},k}, \ldots, e^{j\theta_{M_{LP}}} h_{M_{LP},k}]^T,$$ [Equation 6]

$$i = 1, 2, \ldots, S_{PA}$$

By using a channel vector $h_k$ per terminal, a corresponding line panel codeword may be determined through the following Equation.

$$\hat{h}_k = c_{LP}^{(i_k^*)}$$ [Equation 7]

$$i_k^* = \underset{1 \le i \le S_{PA}}{\operatorname{argmax}} |h_k^H c_{LP}^{(i)}|$$

An operation which selects L (e.g., L=2, 3 or 4) DFT beams based on a DFT codebook in a single panel described by referring to FIG. 2(a) and forms a combined beam expressed as in Equation 4 by selecting L inter-beam co-phasing and amplitude may be applied to each SLP of FIG. 2(b).

Further, as described by referring to FIG. 2(b), an inter-panel co-phasing factor $\theta_{m_{LP}}$ may be selected. For example, $\theta_0$, a phase factor applied to LP 0, may be 1 and $\theta_1$, a phase factor applied to LP 1, may be one of {1, j, −1, −j} (In this case, $B_{LP}$=2).

$y_k$, a signal received in a k-th terminal by considering a precoder, shall be expressed as follows.

$$y_k = h_k p_k s_k + n_k$$ [Equation 8]

In Equation 8, $p_k$ corresponds to a precoding vector for a k-th terminal (i.e., a precoder), $s_k$ corresponds to transmission data and $n_k$ corresponds to noise.

A precoder $p_k$ may be obtained by the following Equation based on zero-forcing and sum-rate calculation.

$$p_k = \alpha \operatorname{pinv}(\hat{h}_k), \alpha = \sqrt{\frac{P_B}{tr(\hat{h}_k(\hat{h}_k)^H)}}$$ [Equation 9]

In Equation 9, pinv( ) corresponds to pseudoinverse and tr( ) corresponds to a diagonal sum. $P_B$ corresponds to signal transmit power and that value may be configured according to a situation of a transmitter.

Figure 3:
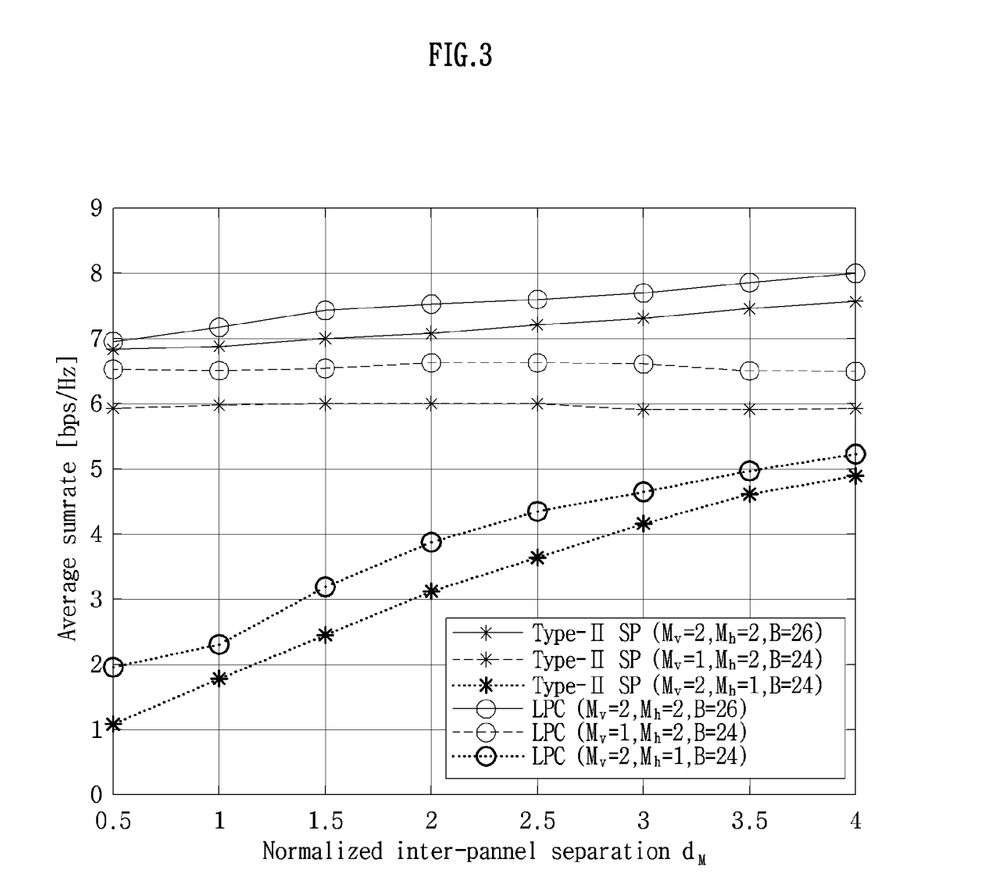
FIG. 3 is a diagram which represents a simulation result related to the present disclosure.

FIG. 3 is a diagram which represents a simulation result related to the present disclosure.

An example of FIG. 3 represents average sum-rate performance of a technique designing the existing Type-II SP codebook according to a change of a panel distance $d_M$ and a Type-II LP codebook (marked with LPC) according to the present disclosure in a MPA system. B represents the number of CIS feedback bits.

Noise in a communication environment assumes AWGN (average white Gaussian noise) whose average value is 0 and variance is $\sigma^2$ and a SINR (signal to interference-plus-noise ratio) is calculated by the following Equation.

$$SINR_k = \frac{|h_k(\hat{h}_k^T)^{-1}|^2}{\sum_{\bar{k}=1, \bar{k} \ne k}^{K} |h_k(\hat{h}_{\bar{k}}^T)^{-1}|^2 + \sigma^2}$$ [Equation 10]

An average sum-rate is defined as in the following Equation.

$$R = \sum_{k=1}^{K} \log_2(1 + SINR_k)$$ [Equation 11]

Figure 4:
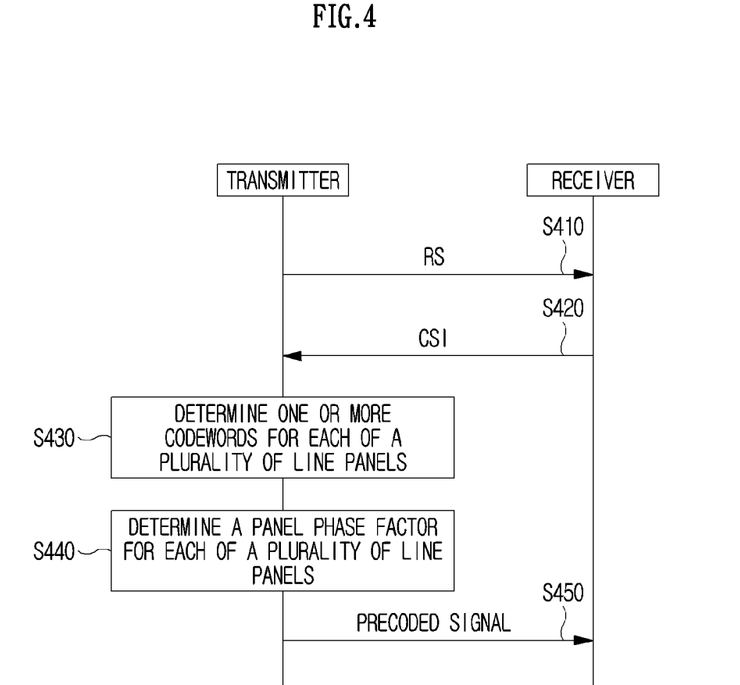
FIG. 4 is a diagram for describing a line panel codebook-based transmission and reception method according to an embodiment of the present disclosure.

FIG. 4 is a diagram for describing a line panel codebook-based transmission and reception method according to an embodiment of the present disclosure.

In Step S410, a transmitter (e.g., a base station) may transmit a reference signal (RS) to a receiver (e.g., a k-th terminal). A RS may include a CSI-RS, etc.

In Step S420, a receiver may estimate a channel (e.g., H) based on a RS received from a transmitter and determine or calculate channel status information (CSI) to perform feedback for a transmitter. CSI may include a PMI and a panel phase factor. A PMI may include at least WB PMI information. A panel phase factor may include the above-mentioned panel co-phasing coefficient. Additionally, CSI may further include a CQI (channel quality indicator), a RI (rank indicator), etc.

In Step S430, a transmitter may determine one or more codewords for each of a plurality of line panels by referring to CSI from a receiver (but, it is not limited to be necessarily based on CSI of a receiver). Here, it is assumed that a codebook per line panel is pre-shared or predefined between a transmitter and a receiver and the one or more codewords may be selected/determined among codebooks per line panel.

In Step S440, a transmitter may determine a phase factor for each of a plurality of line panels by referring to CSI from a receiver (but, it is not limited to be necessarily based on CSI of a receiver). A panel phase factor may correspond to a panel co-phasing factor or an inter-panel co-phasing factor.

In Step S450, a transmitter may apply precoding to a signal/data which will be transmitted to a receiver through a MPA including a plurality of line panels and transmit a precoded signal to a receiver. Precoding may be applied based on one or more codewords and a panel phase factor per panel determined in Steps S430 and S440.

Figure 5:
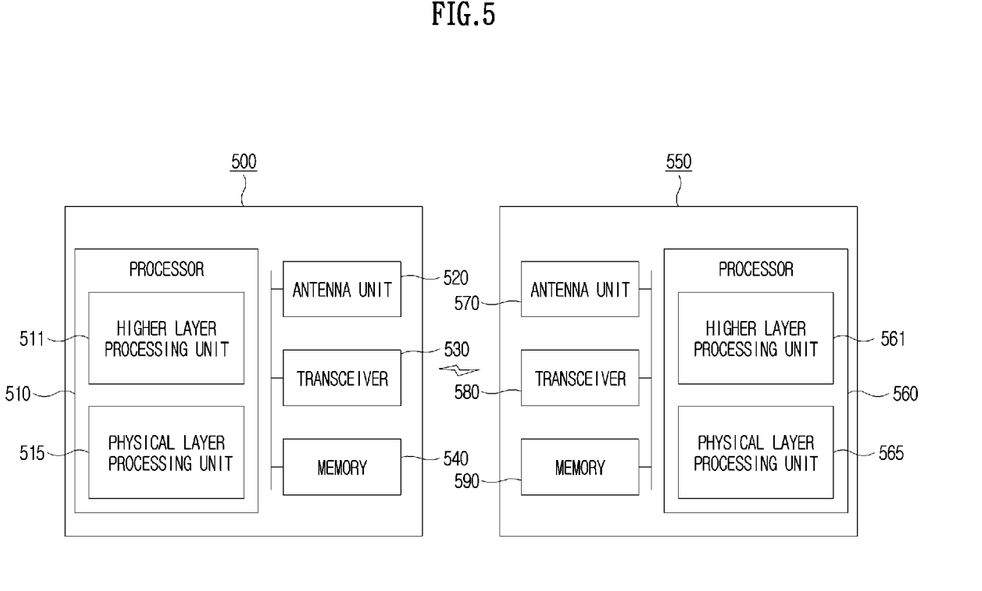
FIG. 5 is a diagram which represents a configuration of a transmitter and a receiver according to the present disclosure.

FIG. 5 is a diagram which represents a configuration of a transmitter and a receiver according to the present disclosure.

A transmission device 500 may include a processor 510, an antenna unit 520, a transceiver 530 and a memory 540.

A processor 510 may perform signal processing related to a baseband and include a higher layer processing unit 511 and a physical layer processing unit 515. A higher layer processing unit 511 may process an operation of a MAC layer, a RRC layer, or a higher layer or above. A physical layer processing unit 515 may process an operation of a PHY layer (e.g., transmission/reception signal processing, etc. in an uplink/a downlink/a sidelink). A processor 510 may control an operation of a transmission device 500 in general, as well as perform signal processing related to a baseband.

An antenna unit 520 may include one or more physical antennas and support MIMO transmission and reception when including a plurality of antennas. A transceiver 530 may include a RF transmitter and a RF receiver. A memory 540 may store processed information of a processor 510, a software, an operating system, an application, etc. related to an operation of a transmission device 500 and may include an element such as a buffer, etc.

A processor 510 of a transmission device 500 may be configured to implement an operation of a transmitter in embodiments described in the present disclosure.

For example, a physical layer processing unit 515 of a processor 510 of a transmission device 500 may operate to determine one or more codewords and a panel phase factor for each of a plurality of line panels equipped with an antenna unit 520, precode data which will be transmitted to a receiving device 550 based on the determined one or more codewords and the panel phase factor and transmit a precoded signal to a receiving device 550 through a transceiver 530.

A receiving device 550 may include a processor 560, an antenna unit 570, a transceiver 580 and a memory 590.

A processor 560 may perform signal processing related to a baseband and include a higher layer processing unit 561 and a physical layer processing unit 565. A higher layer processing unit 561 may process an operation of a MAC layer, a RRC layer, or a higher layer or above. A physical layer processing unit 565 may process an operation of a PHY layer (e.g., transmission/reception signal processing, etc. in an uplink/a downlink/a sidelink). A processor 560 may control an operation of a receiving device 550 in general, as well as perform signal processing related to a baseband.

An antenna unit 570 may include one or more physical antennas and support MIMO transmission and reception when including a plurality of antennas. A transceiver 580 may include a RF transmitter and a RF receiver. A memory 590 may store processed information of a processor 560, a software, an operating system, an application, etc. related to an operation of a receiving device 550 and may include an element such as a buffer, etc.

A processor 560 of a receiving device 550 may be configured to implement an operation of a receiver in embodiments described in the present disclosure.

For example, a physical layer processing unit 565 of a processor 560 of a receiving device 550 may estimate a channel based on a reference signal received from a transmitting device 500 through an antenna unit 570 and a transceiver 580 and determine/calculate channel status information related to an estimated channel. Channel status information may include information related to one or more codewords and a panel phase factor for each of a plurality of line panels equipped with an antenna unit 520 of a transmitting device 500. Channel status information may be transmitted to a transmitting device 500 through a transceiver 580.

For an operation of a transmitting device 500 and a receiving device 550, a matter described about a receiver and a transmitter in embodiments of the present disclosure may be equally applied and an overlapping description is omitted.

Illustrative methods of the present disclosure are expressed as motion series for clarity of a description, but it is not to limit an order that a step is performed and if necessary, each step may be performed simultaneously or in a different order. To implement a method according to the present disclosure, other step may be additionally included in an illustrated step, or remaining steps except for some steps may be included, or an additional other step except for some steps may be included.

A variety of embodiments of the present disclosure do not enumerate all possible combinations, but are to describe a representative aspect of the present disclosure, and matters described in various embodiments may be independently applied or may be applied by at least two combinations.

In addition, a variety of embodiments of the present disclosure may be implemented by a hardware, a firmware, a software, or their combination, etc. For implementation by a hardware, implementation may be performed by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general processors, controllers, microcontrollers, microprocessors, etc.

A scope of the present disclosure includes software or machine-executable commands (e.g., an operating system, an application, a firmware, a program, etc.) which execute an action according to a method of various embodiments in a device or a computer and a non-transitory computer-readable medium that such software or commands, etc. are stored and are executable in a device or a computer.

The invention claimed is:

1. A method for transmitting a precoded signal by a transmitter to a receiver in a wireless communication system, the method comprising:

determining one or more codewords and a panel phase factor for each of a plurality of line panels equipped with the transmitter;

precoding data to be transmitted to the receiver based on the determined one or more codewords and the panel phase factor; and transmitting the precoded signal to the receiver, wherein a respective panel phase factor is applied to each of the plurality of line panels, and wherein no panel phase factor is applied to a plurality of antenna panels within each of the plurality of line panels.

2. The method of claim 1, wherein:

the determined one or more codewords are applied to each of the plurality of line panels.

3. The method of claim 2, wherein:

the precoded signal is transmitted to the receiver through a multi-antenna array including the plurality of line panels.

4. The method of claim 3, wherein:

the plurality of antenna panels within each of the plurality of line panels are antenna panels positioned in a vertical direction of the multi-antenna array.

5. The method of claim 4, wherein:

the panel phase factor is an inter-panel co-phasing factor.

6. The method of claim 5, wherein:

the one or more codewords are determined within a single line panel (SLP) codebook for each line panel.

7. The method of claim 6, wherein:

the panel phase factor is determined within a panel phase calibration codebook.

8. The method of claim 7, wherein:

the SLP codebook, $C_{SLP}$, for the each line panel is determined by an equation $$\bar{h}_{m_{LP},k} = c_{SLP}^{(i^*_{m_{LP},k})}$$

$$i^*_{m_{LP},k} = \underset{1 \leq i \leq S}{\operatorname{argmax}} |h_{m_{LP},k}^H c_{SLP}^{(i)}|,$$

where $\bar{h}_{m_{LP},k}$ corresponds to a channel vector corresponding to a $m_{LP}$-th line panel for a k-th receiver calculated in the transmitter, $$c_{SLP}^{(i_{m_{LP},k}^*)}$$

is a codeword candidate for the each line panel, $$\underset{1 \leq i \leq S}{\operatorname{argmax}} |h_{m_{LP},k}^H c_{SLP}^{(i)}|$$

corresponds to an operation of obtaining a vector $C_{SLP}^{(i)}$ whose absolute value is maximized by being multiplied by the channel vector $h_{m_{LP},k}^H$ among the SLP codebook, $C_{SLP}$, which is a matrix including S codeword vectors, $c_{SLP}^{(1)}, C_{SLP}^{(2)}, \ldots, C_{SLP}^{(S)}$.

9. The method of claim 8, wherein:
the panel phase calibration codebook includes $S_{PA}$ codebooks and is $$S_{PA} = 2^{B_{LP}(M_{LP}-1)},$$

where $B_{LP}$ is a number of bits for representing the panel phase factor, $M_{LP}$ is a number of the plurality of line panels.

10. The method of claim 9, wherein:
the $S_{PA}$ codewords are defined by $$[e^{j\theta_1}, \ldots, e^{j\theta_{m_{LP}}}, \ldots, e^{j\theta_{M_{LP}}}]^T \text{ and where}$$

$$\theta_{m_{LP}} \in \left\{0, \frac{2\pi}{2^{B_{LP}}}, \ldots, \frac{2\pi(2^{B_{LP}}-1)}{2^{B_{LP}}}\right\}.$$

$\theta_{m_{LP}}$ ($m_{LP}=1, 2, \ldots, M_{LP}$) is the inter-panel co-phasing factor.

11. The method of claim 10, wherein:
a line panel (LP) codebook, $C_{LP}$, is determined based on the SLP codebook, $C_{SLP}$, for the each line panel and the panel phase calibration codebook.

12. The method of claim 11, wherein:

$$C_{LP} = \left\{c_{LP}^{(1)}, c_{LP}^{(2)}, \ldots, c_{LP}^{(S_{PA})}\right\} \text{ and}$$

$$c_{LP}^{(i)} = \left[e^{j\theta_1}\bar{h}_{1,k}, \ldots, e^{j\theta_{m_{LP}}}\bar{h}_{m_{LP},k}, \ldots, e^{j\theta_{M_{LP}}}\bar{h}_{M_{LP},k}\right]^T,$$

$$i = 1, 2, \ldots, S_{PA}$$

the LP codebook, $C_{LP}$, is a matrix including $S_{PA}$ codeword vectors, $c_{LP}^{(1)}, c_{LP}^{(2)}, \ldots, c_{LP}^{(S_{PA})}$.

13. The method of claim 1, wherein:
channel status information including information related to one or more codewords and the panel phase factor for each of the plurality of line panels is received from the receiver.

14. A device for transmitting a precoded signal in a wireless communication system, the device comprising:
a multi-antenna array equipped with a plurality of line panels;
a transceiver;
a memory; and
a processor,
wherein the processor is configured to:
determine one or more codewords and a panel phase factor for each of the plurality of line panels;
precode data to be transmitted to a receiver based on the determined one or more codewords and the panel phase factor; and
transmit the precoded signal to the receiver through the transceiver,
wherein a respective panel phase factor is applied to each of the plurality of line panels, and
wherein no panel phase factor is applied to a plurality of antenna panels within each of the plurality of line panels.

* * * * *